Nov. 2, 1965   A. J. BUERGER   3,215,763
METHOD FOR MAKING A MOLD
Filed Oct. 31, 1960
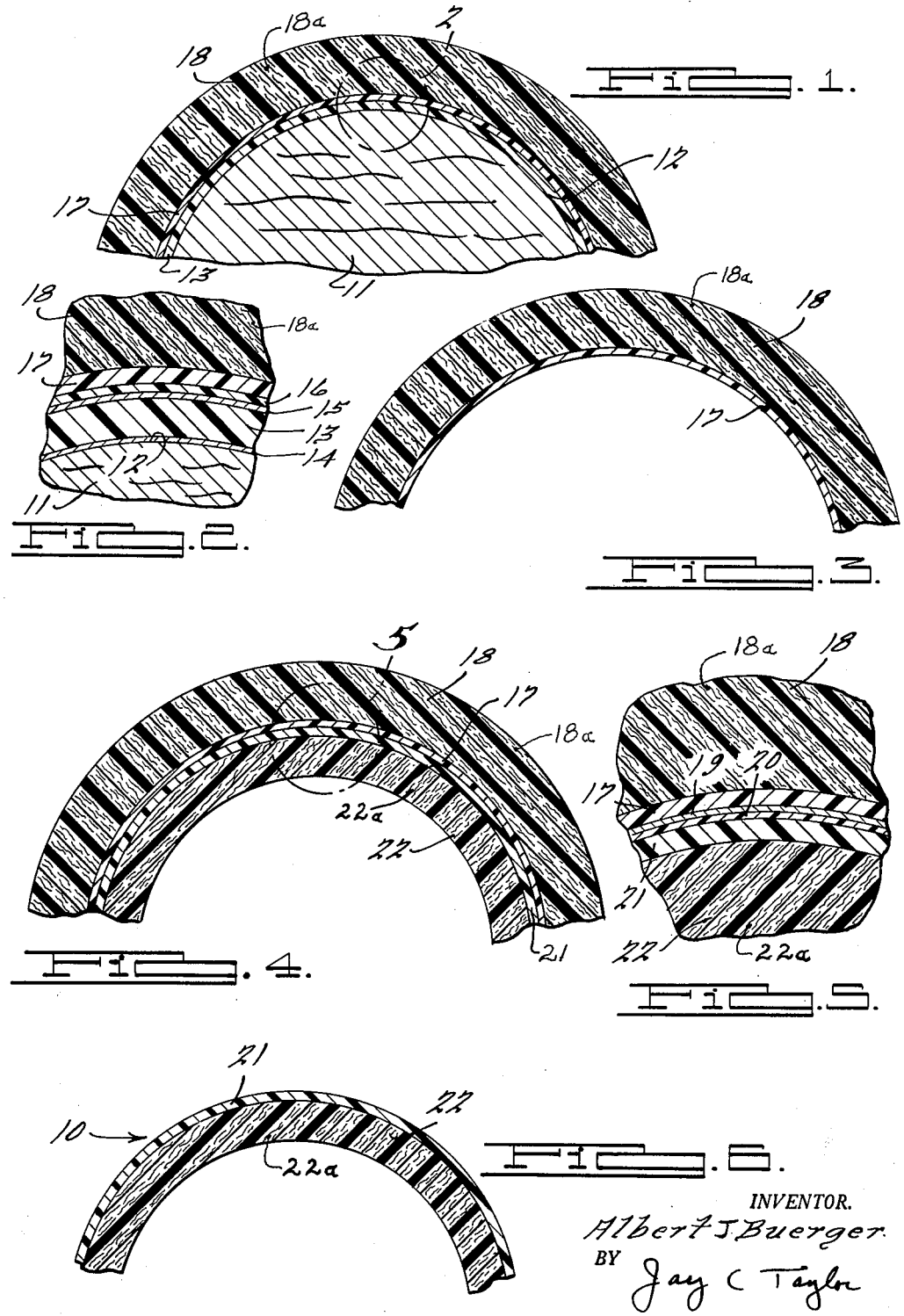
INVENTOR.
Albert J. Buerger
BY Jay C Taylor
ATTORNEY.

United States Patent Office 3,215,763
Patented Nov. 2, 1965

3,215,763
METHOD FOR MAKING A MOLD
Albert J. Buerger, 408 4th St., Manistee, Mich.
Filed Oct. 31, 1960, Ser. No. 66,012
2 Claims. (Cl. 264—220)

This invention relates to an improvide mold and method of making the same and glass fiber reinforced resin articles, particularly hand lay-ups of decorative panels for various purposes.

An example of an application of the present invention is the production of fiber glass deck panels for small pleasure craft. One of the most economical methods known heretofore of producing such panels involves first the making of a master pattern or form from wood. The exterior of the pattern is necessarily sanded to a smooth surface, filled with a suitable sealer, then successively sanded and lacquered or varnished with as many as half a dozen coats, and finally polished to remove the most inconspicuous surface irregularities. After coating the polished surface with a suitable parting agent, successive layers of uncured or partially cured resin and glass fiber reinforcement are applied to the pattern to obtain a mold of the required thickness and rigidity. The resin is cured in place on the pattern, then carefully removed and trimmed if necessary to provide a mold for subsequent use in forming the desired panels.

Regardless of the care taken to smooth, varnish, and polish the wood pattern as explained above, the wood grain and glue joints of the pattern are usually visible in the surface of the resulting mold after its removal from the pattern. Although the curing process is carried out at room temperature with mere contact pressure, the slight heat of the exothermic curing process apparently raises the grain of the wood pattern and impresses the same in the surface of the mold. In consequence, additional sanding and polishing of the comparatively hard glass fiber reinforced resin must be done in order to complete a satisfactory mold.

After completion of the mold, the article is fabricated similarly to the mold. The latter is first coated with a suitable parting agent which commonly comprises a wax film that is buffed to a high polish. A gel coat is next applied and dried sufficiently to support successive layers of incompletely cured resin impregnated glass fibers which comprise the body of the panel. When the resin layers are substantially cured, the panel is removed from the mold.

An objection to the above outlined process for forming the mold and article is the appreciable cost and time involved in polishing both the pattern and the resulting mold to eliminate the wood grain which would otherwise appear in the finished surface of the resulting panel. Other materials than wood, such as metal and plaster, by way of example, have been proposed for the master pattern, but none of these materials can be fabricated with the ease and economy of wood in the usual instance. Even a plaster pattern must be sealed and polished. Also such patterns can only produce a panel with a smooth surface. Where it is desirable to provide an embossed surface ornamentation in the panel, or otherwise to provide a roughened or textured exterior for the purpose of minimizing sun glare or to increase the frictional foothold when the panel is to be used for the deck of a pleasure boat, for example, no simple economical method has been available for providing a wide range of textured or embossed patterns in such panels.

Important objects of the present invention are therefore to provide a simple, improved and economically fabricated master form, mold, and finished article of the foregoing character having either a smooth exterior surface or any of an almost unlimited variety of textured or embossed designs, and to provide an improved process for fabricating such a master form, mold, and finished article which significantly shortens the time and eliminates much of the labor and expense required heretofore in the production of the master form and mold, and which also enables the production of a superior finished article for many types of applications.

Other objects of this invention will appear in the following description and appended claims, reference being had to the accompanying drawings forming a part of this specification wherein like reference characters designate corresponding parts in the several views.

FIGURE 1 is a sectional view through a master pattern and mold embodying the present invention, showing the relationship of these elements prior to separation of the mold from the pattern. In this and all subsequent views, the relative dimensions of the layers are shown out of proportion for the sake of illustration.

FIGURE 2 is an enlarged fragmentary section taken substantially within the dashed outline 2 of FIGURE 1.

FIGURE 3 is a view similar to FIGURE 1, showing the mold removed from the master pattern.

FIGURE 4 is a sectional view through the mold and a panel formed thereon, showing these items prior to separation of the panel from the mold.

FIGURE 5 is an enlarged fragmentary section taken substantially within the dashed outline 5 of FIGURE 4.

FIGURE 6 is a view similar to FIGURE 4, showing the panel removed from the mold.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, the present invention is illustrated by way of example in the fabrication of a panel 10, FIGURE 6, which could be part of a vehicle instrument panel, a boat deck, or other similar structure. In the preparation of such panels by hand lay-up processes wherein the expense of making a permanent metal die is not warranted, a wood pattern 11 is first formed with a smooth exterior surface 12 having the desired exterior contour of the panel 10. Thereafter a cover 13 of flexible sheet material is cemented to the surface 12 by a suitable glue or adhesive 14 and pressed firmly into position so as to conform closely to the contour of the surface 12. The latter surface need not be sealed, lacquered, or polished prior to securing the cover sheet 13 thereto, but should be sufficiently smooth so as not to cause objectionably visible deformities in the outer surface of the cover sheet 13. In this regard, a cover sheet 13 of rough and irregular texture will conceal irregularities in the surface 12 more completely than will a smooth cover sheet 13. In any event, the cover sheet 13 as described below, serves as a seal for the underlying pattern 12 and obscures minor irregularities therein, so that appreciable time and labor in preparing and finishing the surface 12 are saved.

Although the master pattern 11 is preferably fabricated from wood in the usual instance because of its structural quality and the facility with which it can be worked, any other suitable material such as plaster, plastic, metal and the like can be employed where desired. A preferred cover sheet 13 is a flexible polymerized resin plastic such as a vinyl chloride, a nitrocellulose, a polyethylene or any other suitable plastic sheeting. The thickness of the cover sheet 13 can vary greatly, being determined to some extent by the allowable tolerances in the dimensions of the final article 10 and the initial smoothness of the surface 12. Usually a thickness of less than one-tenth of an inch will be employed, although the thickness will be somewhat greater where certain fabric textures are desired, as described below, or will be as thin as a thousandth of an inch where the cover sheet 13 is employed primarily as a "seal" for the wood pattern 11.

Vinyl sheeting is particularly desirable for use as the cover 13 where an embossed design is to be reproduced in the exterior surface of the article 10, because such sheeting can be readily obtained in a wide variety of embossed designs or textures. Other sheeting materials include real or artificial leather such as reptile skin and leatherette, treated canvas or burlap, Naugahyde, and similar flexible textured materials. Where coarse or absorbent materials such as canvas or burlap are used, these should be coated or impregnated with a thin flexible film forming resin which will seal the fibers of the material without unduly masking or obscuring the texture to be reproduced in the final article 10.

In the above regard, the absorbent sheet material can be dipped in a solution comprising a thermoplastic resin or an incompletely cured thermosetting resin in a volatile solvent prior to being cemented to the form 11, or the sheet material can be sprayed with such a solution after being cemented to the form 11, depending on the porosity and coarseness of the sheet material. The resin in the solution may include any of those mentioned above. I have found that an alcohol solution of a flexible film forming polyvinyl alcohol gives excellent results even with materials as coarse and fibrous as burlap. The resulting treated sheet should be free of recesses with overhanging sidewalls, or wild strands of fibers of fabric, which would interlock with subsequently applied layers of the mold as described below.

When the cement 14 holding the cover sheet 13 is set, the latter is coated with a film of a suitable parting or release agent, which may comprise a wax 15, as for example a paste wax made from a carnauba base. Several thin coats which should be rubbed down or buffed are preferred. After the final wax coat is dry, a supplemental film forming parting agent 16, as for example a solution of a polyvinyl alcohol may be applied where required over the surface of the waxed cover layer 13 and allowed to dry completely.

The form or pattern is now in condition for lay-up of the mold thereon, FIGURE 3. The latter preferably comprises a gel coat 17 of an incompletely polymerized thermosetting resin, such as a polyester or epoxy resin for example, which is applied in a fluid condition over the parting films 15 and 16 and allowed to cure or harden at contact pressure and at room temperature. The gel coat 17 will ordinarily be between .01" and .05" thick and preferably about .02" to .03" thick and should comprise a material which will not bond to the parting film. If the cover layer 13 is of a type such as a polyethylene sheet which does not bond to the gel coat 17, the parting agent 15, 16 can be eliminated.

Over the hardened gel coat 17 are applied several coats 18 of resin impregnated glass fibers 18a to build up sufficient thickness to assure adequate shape sustaining rigidity for the mold. The glass fibers 18a in the layer 18 reinforce the resin therein, which may be of the same type as in the gel coat 17 and which like the latter preferably cures to a durable hard finish. After the layers 17 and 18 comprising the mold are substantially cured, the mold is carefully removed from the cover layer 13 and trimmed if necessary. The resulting mold, FIGURE 3, will have a texture or embossed design in its hardened gel coat 17 which will be a negative or reversal of the design in the cover layer 13, so that the mold can be used repeatedly to reproduce this design in articles 10 formed thereon.

In order to fabricate the article 10, similarly to the parting films 15, 16, several coats of wax 19 may be applied to the gel coat 17 and buffed or rubbed down and then supplemented where necessary by a film forming parting agent 20 which is allowed to dry. Thereafter a gel coat 21, similar to the coat 17, is applied over the parting layer 20 and substantially cured in place. In this instance the gel coat 21 is preferably pigmented to afford an opaque layer of the color desired. When the gel coat 21 is sufficiently hard, a layer 22 of resin impregnated glass fibers 22a similar to the layer 18, is applied. Preferably the layer 22 is applied in several coats to build up the desired thickness for the article 10. When the layers 21 and 22 comprising the panel or article 10 are substantially cured, the panel 10 is carefully removed from the mold. The design of the original cover layer 13 will be accurately reproduced in the pigmented gel coat 21 to achieve an ornamental or textured exterior for the panel 10 as desired.

It is apparent in accordance with the foregoing, that by employing the cover sheet 13 over a wood form, simplification and economies in fabrication of both the form, FIGURE 1, and mold, FIGURE 3, are achieved whereby the cost of fabricating these members is reduced by approximately one-third from the cost by conventional methods and whereby ornamental or textured designs can be achieved in the resulting article 10 that have not been possible heretofore by simple hand lay-up processes of the type described.

I claim:

1. In the method of molding a plastic article, the steps of first shaping a master wood form and smoothing a surface thereof conforming to the general contour desired for said article, then cementing and firmly pressing closely to said surface a flexible cover sheet to prevent the grain pattern of the wood of said form from being impressed into a mold by rising of said pattern in consequence of the exothermic curing reaction of an incompletely cured mold forming thermosetting resin to be subsequently cured on said sheet in the formation of a mold thereon, coating said sheet with a parting agent, forming said mold on said cover sheet by coating the same over said parting agent with said incompletely cured resin, substantially curing said mold on said form and cover sheet to preserve a reversal of the contour of said cover sheet in the surface of said mold confronting said cover sheet, removing said mold from said cover sheet and form, coating the reversal of said contour on said mold with a parting agent, forming said article by applying a resin over the parting agent on said mold, and allowing the latter resin to harden on said mold.

2. In the method of molding a plastic article, the steps of shaping a master wood form and smoothing a surface thereof conforming to the general contour desired for said article, applying an adhesive between said surface and a flexible cover sheet impervious to penetration by an incompletely cured mold forming thermosetting resin to be subsequently cured on said sheet over said form in the formation of a mold thereon and effective to prevent the grain pattern of the wood of said form from being impressed into said mold by rising of said pattern in consequence of the exothermic curing reaction of said resin, cementing said cover sheet to said surface by firmly pressing said cover sheet closely against said surface and allowing said adhesive to set, coating said sheet with a parting agent, forming said mold on said cover sheet by coating the same over said parting agent with said incompletely cured resin reinforced with glass fibers, substantially curing said mold on said form and cover sheet to preserve a reversal of the contour of said cover sheet in the surface of said mold confronting said cover sheet, removing said mold from said cover sheet and form, coating the reversal of said contour on said mold with a parting agent, forming said article by applying a resin reinforced with glass fibers over the parting agent on said mold, and allowing the latter resin to harden on said mold.

(References on following page)

References Cited by the Examiner

UNITED STATES PATENTS

| | | | |
|---|---|---|---|
| 1,835,805 | 12/31 | Norris. | |
| 2,613,397 | 10/52 | Borkland | 156—224 |
| 2,614,955 | 10/52 | Halsall | 154—110 |
| 2,845,379 | 7/58 | Bey | 156—289 XR |
| 2,883,315 | 4/59 | Palmquist | 161—232 |
| 3,054,703 | 9/62 | Brasure | 161—214 |

OTHER REFERENCES

"Army Sleds for the Arctic," Holmes, Modern Plastics, April 1952, pp. 115–118.

EARL M. BERGERT, *Primary Examiner.*

CARL F. KRAFFT, ALEXANDER WYMAN,
*Examiners.*